United States Patent [19]
Green

[11] 3,748,929
[45] July 31, 1973

[54] VARIABLE POWER TRAIN AND CONTROL
[75] Inventor: Lawrence E. Green, Ann Arbor, Mich.
[73] Assignee: General Motors Corporation, Detroit, Mich.
[22] Filed: May 17, 1971
[21] Appl. No.: 143,805

[52] U.S. Cl.................. 74/844, 180/53 R, 180/79.2
[51] Int. Cl.......................................... B60k 27/08
[58] Field of Search...................... 74/844, 843, 878; 180/79.2, 53 R; 192/91 R, 82 T, .07, .073

[56] References Cited
UNITED STATES PATENTS

| | | | |
|---|---|---|---|
| 3,065,810 | 11/1962 | Chambers et al................ | 180/53 R |
| 2,095,833 | 10/1937 | Rockwell.......................... | 192/82 T |
| 2,658,400 | 11/1953 | Dodge............................... | 192/82 T |
| 3,270,588 | 9/1966 | Bowen et al. ..................... | 192/82 T |
| 3,407,894 | 10/1968 | Thompson et al. ............... | 180/53 R |
| 3,613,818 | 10/1971 | Schubert.......................... | 180/79.2 R |

Primary Examiner—Charles J. Myhre
Assistant Examiner—Thomas C. Perry
Attorney—W. E. Finken, A. M. Heiter and D. F. Scherer

[57] ABSTRACT

A power train and control therefor including an engine driven transmission selectively shiftable to a plurality of forward drive positions and a reverse drive position and a neutral drive position. The transmission control includes a manual shift valve which directs fluid pressure from an engine driven pump to the transmission friction drive engaging devices. This manual control valve is movable to a plurality of drive conditions including a neutral condition. A heat sensor is placed in the engine exhaust manifold to determine the temperature of the exhaust gas from the engine. When the engine stalls, the exhaust gas temperature will decrease rapidly which decrease in temperature is detected electronically to control a shift lock control valve which directs fluid pressure from the pump to a locking member located adjacent the manual shift valve which will prevent shifting of the manual valve from the drive or reverse to the neutral position. The shift lock control also directs fluid pressure from the transmission governor to the transmission control to assist in automatic shifting. When the engine is stalled the governor pressure directed to the shift lock control is blocked and replaced with line pressure to prevent automatic shift changes from occurring in the transmission.

4 Claims, 1 Drawing Figure

Patented July 31, 1973
3,748,929
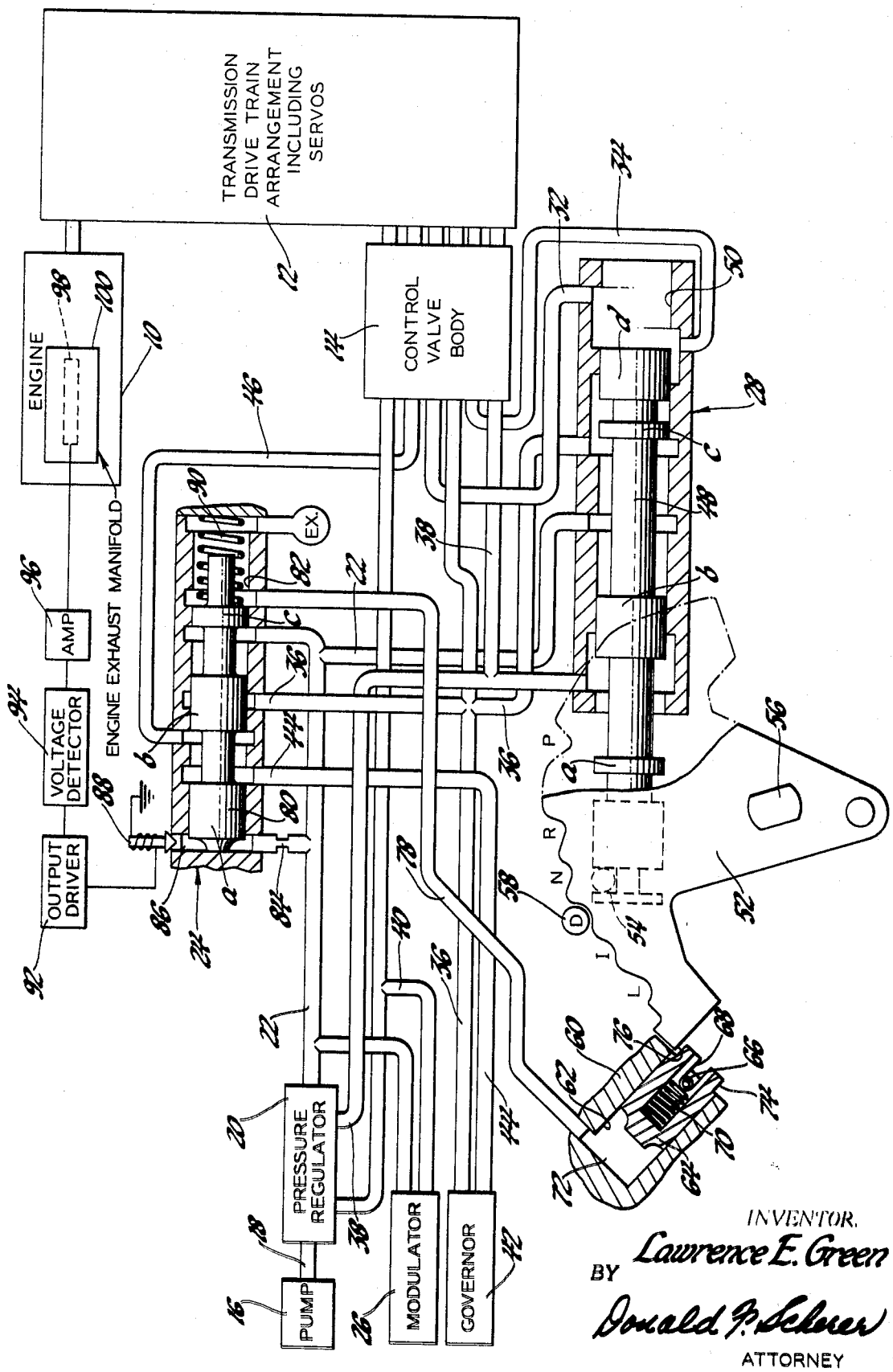
INVENTOR.
Lawrence E. Green
BY
Donald F. Scherer
ATTORNEY

VARIABLE POWER TRAIN AND CONTROL

This invention relates to engine driven transmissions and controls therefor and more particularly to engine driven transmissions having controls which prevent the automatic downshifting or manual shifting to neutral of the transmission when the engine is stalled.

The present invention is usable in the system in which a thermocouple disposed in the engine exhaust manifold senses engine temperature and relays this temperature signal through an electronic amplifier and voltage detector to a solenoid valve to actuate a control valve on the decrease of engine temperature. The control valve in turn controls fluid flow from the transmission pump to direct the flow to the transmission governor when the engine temperature is normal and to substitute line pressure for governor pressure when the engine exhaust temperature falls below a predetermined level. The control valve also controls the distribution of fluid pressure to a locking device which is comprised of a piston slidably disposed in a valve bore. Upon pressurization the piston will move in the valve bore to abut the shift quadrant connected to the manual valve of the transmission. When the piston has been fully shifted, the shift quadrant will engage the piston if a manual shift is attempted from the drive or reverse positions to the neutral position. Thus, the transmission cannot be shifted from drive or reverse to neutral when the engine stalls. The replacement of governor pressure with line pressure in the transmission control also prevents or inhibits automatic downshifting from the high drive ratio to a lower drive ratio when the engine is stalled. Thus, the various friction devices in the transmission remain engaged when the engine stalls to provide a drive from the vehicle wheels through the output of the transmission to the input of the transmission to maintain the transmission pump in driving relationship so that it will supply fluid pressure for the transmission control and other functions it may have to perform. The transmission pump can also be used to supply fluid to the power steering, the vehicle brakes, the windshield wiper motor and other various accessories on the automobile.

It is therefore an object of this invention to provide in an improved power train and control a control valve which is actuated by engine exhaust temperature to direct fluid pressure to a locking member to prevent manual shifting of a transmission from drive or reverse to neutral.

It is another object of this invention to provide in an improved power train and control an engine heat sensor which controls a fluid control valve which is in fluid communication with a transmission pump and governor to direct fluid pressure to the manual shift valve in the transmission to prevent manual shifting to neutral when the engine temperature decreases below a predetermined value and to direct line pressure in place of governor pressure in the transmission control to prevent automatic downshifting of the transmission when the engine temperature decreases upon engine stall.

These and other objects and advantages of the invention will be more apparent from the following description and drawings in which:

The single FIGURE is a diagrammatic representation of the power train and control.

Referring to the drawing there is shown a conventional internal combustion engine 10 driving an automatic transmission 12 such as that disclosed in Winchell et al. U.S. Pat. No. 3,321,056 issued May 23, 1967. The transmission includes a control valve body 14 which is operable to control automatic shifting between the various friction devices of the transmission. The control 14 is similar to that shown in the Winchell et al. Pat. No. 3,321,056, mentioned above. The control valve body 14 receives fluid pressure from an input driven pump 16 through a passage 18 and a conventional pressure regulator 20 which controls the fluid pressure in the system. The pressure regulator 20 may be similar to the pressure regulator shown in the Winchell et al. patent mentioned above.

The fluid pressure from pump 16 passes through the regulator valve and is supplied by a passage 22 to a control valve generally designated 24, a modulator valve 26 and a manual valve generally designated 28. The control valve body 14 redirects the fluid through a plurality of shift valves and accumulator valves to direct the fluid to the friction drive establishing devices in the transmission 12. The control valve body 14 also receives fluid pressure from the manual valve via low passage 32 when the manual valve is in the low or L-position, the intermediate passage 34 when the transmission is in the intermediate or I-position, via drive passage 36 when manual valve is in the drive or D-position as shown, and via passage 38 when the transmission is in the reverse or R position. The transmission control uses these fluid pressures to determine whether automatic shifting or holding of particular drive ratios will be maintained. A description of the automatic shifting of the valves is contained in the Winchell et al. patent mentioned above.

The passage 38 is also in fluid communication with the pressure regulator 20 and provides a pressure boost for the control system in reverse as described in the above mentioned Winchell et al. patent. The modulator valve 26 is similar in design to that shown in the Winchell et al. patent mentioned above and supplies fluid pressure via passage 40 to the control system and to the pressure regulator to perform functions, relating to engine or input torque demand, in the transmission. These functions include controlling shift point and are more fully discussed in the Winchell et al. patent. The passage 36 supplies fluid pressure from the manual valve 28 to a governor 42 similar in construction to that disclosed in the Winchell et al. patent mentioned above. The governor 42 supplies fluid pressure via passage 44 through the control valve 24 through a passage 46 which is in fluid communication with the control valve body 14. The governor pressure and the modulator pressure in passage 40 operate on the shift control valves to control the automatic shifting of the transmission friction devices. A description of this type of automatic shift control is found in the Winchell et al. patent.

The manual valve 28 includes a valve spool 48 slidably disposed in a valve bore 50 and having equal diameter spaced lands a, b, c and d. These lands control the distribution of fluid in main passage 22 through the various fluid passages communicating with the control valve body, the governor and the control valve 24. The valve spool 48 is moved in the valve bore 50 by a pin 54 which is part of a shift quadrant 52 which is operatively connected through a shaft 56 and other linkage to a conventional transmission shift linkage which is mounted on the steering column of the vehicle. The shift quadrant 52 is pivotally mounted in the transmission housing on shaft 56. The quadrant has an outer perimeter with a plurality of indentations lettered L, I, D, N, R and P which indicate the transmission is in low, intermediate, drive, neutral, reverse and park positions, respectively. Each of these indentations is selectively alignable with a detent pin 58 when the transmission is placed in the respective position. As shown, the shift quadrant 52 is detented in the drive or D-position. Situated adjacent the shift quadrant 52 is a locking control for the quadrant which is comprised of a valve body 60 having a valve bore 62 in which is slidably disposed a piston 64. A pin 66 is secured to the valve body 60 and is disposed in a slot 68 in the piston 64. Compressed between the pin 66 and the one side of piston 64 is a compression spring 70 which urges the piston upward in the valve bore 62 whenever fluid pressure is not available in a chamber 72 formed between the upper end of piston 64 and the closed end of valve bore 62. The lower end of piston 64 has a shoulder 74 which is extendable below the open end of bore 62 to permit movement into the path of the shift quadrant 52 where the shoulder 74 will engage an edge 76 of the shift quadrant to prevent manual shifting from the drive D or the reverse R to the neutral N-position whenever the piston 64 is extended, as shown. The pin 66 abuts the end of slot 68 to prevent movement of the piston 64 in the bore 62 beyond the extension shown. As mentioned above, when pressure in chamber 72 is not available the spring 70 will move the piston 64 to the end of valve bore 62 to permit free movement of the shift quadrant 52 from the drive or reverse positions to the neutral position.

The chamber 72 is supplied fluid pressure through a passage 78 which is in fluid communication with the control valve 24. The control valve 24 includes a valve spool 80 having equal diameter spaced lands $a$, $b$ and $c$ slidably disposed in a valve bore 82 which is in fluid communication with the control passage 78, the main passage 22, the governor passage 44 and the drive passage 36, and the control passage 46. One end of the valve bore 82 is in fluid communication with main passage 22 through a restriction 84. A chamber 86 formed between valve land $a$ and the end of bore 82 is controlled by a solenoid operated poppet valve 88. When the solenoid is energized the poppet valve will be opened permitting the fluid in chamber 86 to be exhausted so that the valve spool 80 will be urged to the position shown by a coil spring 90 compressed between one end of valve bore 82 and the land $c$ on valve spool 80. The restriction 84 prevents excess fluid flow from the system when the poppet 88 is open. In the position shown main pressure supplied by main passage 22 is blocked between lands $b$ and $c$ and drive passage 36 is blocked by land $b$ while governor pressure in passage 44 is directed between lands $a$ and $b$ through control passage 46 to the control valve body 14, and control passage 78 is exhausted. When the solenoid is deenergized poppet valve 88 is closed and a fluid pressure in chamber 86 will develop causing the valve spool 80 to move to the right, overcoming the spring 90, to provide fluid communication between drive passage 36 and control passage 46 and main passage 22 and control passage 78 while governor passage 44 is blocked by valve land $a$. When the fluid pressure is directed from main passage 22 to the control passage 78 the piston 64 will assume the position shown to prevent the manual shift change from the drive position or reverse position to the neutral position in the manual valve 28. The pressure in drive passage 36 which is equal to main pressure from the pump 16 is directed via passage 46 to replace the governor pressure in the control valve body 14. With main pressure directed to the control valve body 14, the shift control valves in the transmission will have line pressure imposed upon them. This will inhibit the automatic downshifting of the valves to insure the transmission remains in the direct or high gear and will therefore provide a drive from the vehicle wheels through the output of the transmission to the input of the transmission.

The poppet valve 88 is a solenoid controlled valve. The solenoid is controlled and energized by an output driver, a voltage detector and an amplifier designated 92, 94 and 96, respectively. These are conventional electronic components which receive an electrical signal from a thermocouple 98 which is disposed in the engine exhaust manifold 100. The thermocouple 98 signal is sensed such that no voltage will be applied to the solenoid poppet valve 88 when the engine exhaust manifold temperature is below a predetermined value, for example, 650° F. Above this temperature the thermocouple will cause the electronic components to apply a voltage so that the solenoid poppet valve 88 will be opened as shown when the temperatures are above 650°. When the engine is operating the exhaust temperature will normally be above 800° F, thus under normal operating conditions the poppet valve 88 will remain open as shown. However, should the engine stall the engine exhaust manifold temperature, which is one operating characteristic of the engine, rapidly decreases from above 800° to below 650°. When the unscheduled loss of engine power occurs and the exhaust temperature drops below 650° F, the thermocouple 98 produces a change in its electrical current output which is adapted by the amplifier 96, voltage detector 94 and the output driver 92 of the electrical circuit to deenergize the poppet valve 88 thereby closing the valve to permit pressure to develop in the chamber 86. As described above, when pressure develops in this chamber 86 the shift quadrant 52 is controlled by the piston 64 to prevent downshifting from drive D or reverse R to neutral N and the governor pressure in control passage 46 is replaced by line pressure to prevent automatic downshifting in the control valve body 14. Thus, when the engine stalls the vehicle will remain in a drive ratio which will maintain a drive between the vehicle output and the transmission pump to maintain the pump driving so that fluid pressure will be available for the transmission and control and for other accessory devices which may be connected with the pump.

Obviously, many modifications and variations of the present invention are possible in light of the above teachings. It is, therefore, to be understood that within the scope of the appended claims the invention may be practiced otherwise than as specifically described.

What is claimed is:

1. A power train and control comprising, engine means having an exhaust manifold, heat sensing means for sensing the temperature of said exhaust manifold; transmission means drivingly connected with said engine for establishing a plurality of forward drives and a reverse drive and a neutral condition; and control means for selectively controlling the establishment of the forward and reverse drives and the neutral condition including a source of fluid pressure, manual valve means in fluid communication with said source and being movable to a plurality of positions including a drive position and a reverse position and a neutral position, shift lock control means operatively connected with said manual valve means, and control valve means for directing fluid pressure from said source to said shift lock control means to operate said shift lock control means to prevent shifting of said manual valve means from the drive position or reverse position to the neutral position when the temperature of the exhaust manifold is below a predetermined value.

2. A power train and control comprising, engine means having an exhaust manifold, heat sensing means for sensing the temperature of said exhaust manifold; transmission means drivingly connected with said engine means for establishing a plurality of forward drive ratios and a reverse drive and a neutral condition; and control means for selectively controlling the establishment of the forward and reverse drives and the neutral condition including a source of fluid pressure; governor pressure source for controlling automatic ratio change, manual valve means in fluid communication with said source and being movable to a plurality of positions including a drive position and a reverse position and a neutral position, shift lock control means operatively connected with said manual valve means, and control valve means for substituting pressure from said source for pressure from said governor pressure source to prevent automatic ratio change and for directing fluid pressure from said source to said shift lock control means to operate said shift lock control means to prevent shifting of said manual valve means from the drive position or reverse position to the neutral position when the temperature of the exhaust manifold is below a predetermined value.

3. A transmission and control comprising a plurality of fluid controlled selectively engageable drive ratios and a neutral drive condition; a source of fluid pressure for supplying fluid to control said drive ratios; governor means in fluid communication with said source for delivering a governor pressure to the control for controlling automatic ratio changes of said drive ratios; manual valve means in fluid communication with said source and being movable to a drive and neutral position for controlling manual shifting of the transmission; and control means responsive to a source of engine temperature including valve means for interchanging said source pressure and governor pressure to the control to prevent automatic ratio changes, and lock means responsive to said valve means for preventing movement of said manual valve means from the drive to neutral position when the engine temperature is below a predetermined value.

4. A transmission and control comprising a drive train having a plurality of controlled devices for selectively establishing a plurality of drive ratios and a neutral drive condition; shift control means for selectively operating said controlled devices for selectively establishing said drive ratios and a neutral drive condition and control means responsive to a source of engine temperature operatively connected to said shift control means operative in response to an engine temperature characteristic indicating that the engine power output has experienced an unscheduled loss to overcontrol said shift control means to inhibit shifting to neutral.

* * * * *